United States Patent [19]
Paas

[11] Patent Number: 5,488,826
[45] Date of Patent: Feb. 6, 1996

[54] HEAT ISOLATED CATALYTIC REACTOR

[75] Inventor: Norbert Paas, Louisville, Colo.

[73] Assignee: Dry Systems Technologies, Louisville, Colo.

[21] Appl. No.: 93,772

[22] Filed: Jul. 19, 1993

Related U.S. Application Data

[63] Continuation-in-part of Ser. No. 765,689, Sep. 26, 1991, Pat. No. 5,272,874.

[51] Int. Cl.⁶ .................................................. F01N 3/10
[52] U.S. Cl. ............................ 60/299; 422/179; 422/180
[58] Field of Search .............................. 60/299; 422/180, 422/179

[56]  References Cited

U.S. PATENT DOCUMENTS

| | | |
|---|---|---|
| 2,046,592 | 7/1936 | Tracy . |
| 2,911,289 | 11/1959 | Forry . |
| 3,263,413 | 8/1966 | VanVactor . |
| 3,282,046 | 11/1966 | Walker et al. . |
| 3,771,967 | 11/1973 | Nowak ................................. 60/299 |
| 3,786,635 | 1/1974 | Kates et al. . |
| 3,886,738 | 6/1975 | Sien . |
| 3,903,694 | 9/1975 | Aine . |
| 4,075,994 | 2/1978 | Mayer et al. . |
| 4,091,616 | 5/1978 | Loweg ................................. 60/299 |
| 4,133,654 | 1/1979 | Hill et al. . |
| 4,190,629 | 2/1980 | Strachan ............................... 60/297 |
| 4,338,784 | 7/1982 | Liu et al. . |
| 4,344,922 | 8/1982 | Santiago ............................... 422/180 |
| 4,345,429 | 8/1982 | Yasuhara . |
| 4,350,664 | 9/1982 | Gaysert ................................ 422/180 |
| 4,480,789 | 11/1984 | Kemper . |
| 4,671,060 | 6/1987 | Wilkens . |
| 4,864,821 | 9/1989 | Hoch . |
| 4,869,209 | 9/1989 | Young . |
| 4,887,427 | 12/1989 | Shinzawa et al. . |

FOREIGN PATENT DOCUMENTS 52-63509  5/1977  Japan ........................... 60/302

*Primary Examiner*—Douglas Hart
*Attorney, Agent, or Firm*—Bruce E. Dahl

[57]                ABSTRACT

A catalytic reactor for reducing pollutants in the exhaust gas from an internal combustion engine includes a catalyst element and a heat shield exterior to the catalyst element. The heat shield and catalyst element are mounted within an exhaust pipe so that two annular insulation spaces exist between the catalyst element and the exhaust pipe. The first annular insulation space is located between the interior wall of the exhaust pipe and the exterior wall of the heat shield. The second annular insulation space is located between the interior wall of the heat shield and the catalyst element itself. A spring washer positioned between one end of the catalytic reactor and an axial retaining flange on the exhaust pipe allows the catalytic reactor to expand axially as it heats to operating temperature. A layer of ceramic material may be deposited on the exterior surface of the heat shield to further reduce heat transfer to the exhaust pipe.

15 Claims, 7 Drawing Sheets

HEAT ISOLATED CATALYTIC REACTOR

CROSS-REFERENCE TO RELATED APPLICATION

This application is a continuation-in-part of U.S. application, Ser. No. 07/765,689, filed on Sep. 26, 1991, now U.S. Pat. No. 5,272,874, by the present applicant, Norbert Paas.

BACKGROUND OF THE INVENTION

1. Field of the Invention

This invention relates generally to catalyst apparatus for reducing the emissions of internal combustion engines and more specifically to a heat-isolated catalytic reactor for reducing the emissions of diesel engines intended for use in underground mines and other similar or potentially inflammable or inadequately ventilated environments.

2. Background of the Invention

Diesel engines power a wide variety of vehicles and equipment used in various underground and mining applications due to their improved safety and efficiency over electrically powered vehicles and equipment. However, diesel engines are not without their disadvantages and there remain several problems that need to be solved before diesel engines can be fully utilized in such environments.

Perhaps the most significant problem that has limited the use of diesel engines in mines or other environments having limited ventilation, and with increasing environmental awareness, is becoming a concern in all diesel engine operations, is that the exhaust from the engines contains numerous components thought to be harmful to humans, such as unburned hydrocarbons, carbon monoxide (CO), oxides of nitrogen ($NO_x$), sulfur dioxide ($SO_2$), sulfates, and solid particulate matter. The solid particulate matter typically comprises small, solid, irregularly shaped particles, which are themselves agglomerates of smaller sub-particles. The particles may also have high molecular weight hydrocarbons absorbed on their surfaces. Frequently, the particulate matter is a complex mixture of pure carbon and various kinds of organic materials, and the sizes may range from very small particles of about 0.01 microns to relatively large clusters in the range of 10–30 microns, giving the particulate an extremely fine and light, flour-like consistency. Turbocharged diesel engines tend to emit more of the smaller particles with much lower levels of retained organic compounds. Particle sizes of 10 microns and less are considered to be the most damaging to human lungs, and certain characteristic components of diesel exhaust particulate emissions are known carcinogens.

Another problem which has limited the usefulness of diesel engines in such environments is that diesel engines may emit sparks or flames caused by backfiring through the intake and exhaust manifolds. Of course, any emitted sparks or flames may ignite the various ignitible dusts or explosive gases typically found in the air in underground mines. Also, since the internal operating temperatures of such engines may exceed 1200° F., the external surfaces of the engines may be hot enough to trigger a fire or explosion if ignitable dusts accumulate on the hot external surfaces of the engine or if inflammable liquids come in contact with those hot surfaces.

Several devices have been developed and are being used in attempts to make diesel engines more suitable for use in environments having limited ventilation or containing explosive atmospheres. For example, many manufacturers have reduced the particulate emissions of diesel engines by limiting the amount of fuel injected under acceleration and high load (i.e., lug-down) conditions. However, reducing the amount of fuel injected during acceleration and lug-down operations is not effective to eliminate all solid particulate emission, or even decrease it to a desirably low level, unless the power output of the engine is reduced to an unacceptably low level.

Several alternative systems have also been developed in attempts to find a more effective means of reducing the solid particulate emissions. Principle among these alternative systems are catalysts for catalytically (i.e., thermally) oxidizing the particulate matter while it is still entrained in the exhaust gas, systems for thermally oxidizing filter-trapped particulate matter, and systems for catalytically oxidizing filter trapped particulate matter. Water scrubbers have also found fairly wide-spread applicability in the underground mining environment. Examples of such systems are disclosed in U.S. Pat. No. 3,771,967 issued to Nowak; U.S. Pat. No. 3,786,635 issued to Kates et al.; U.S. Pat. No. 3,886,738 issued to Sien; U.S. Pat. No. 3,903,694 issued to Aine; U.S. Pat. No. 4,075,994 issued to Mayer et al.; U.S. Pat. No. 4,133,654 issued to Hill et al.; U.S. No. 4,338,784 issued to Liu et al.; U.S. Pat. No. 4,345,429 issued to Yasuhara; U.S. Pat. No. 4,671,060 issued to Wilkens; and U.S. Pat. No. 4,864,821 issued to Hoch.

Unfortunately, none of these systems has proven to be a panacea, and there remain a number of serious shortcomings which have tended to make them unsuitable for use, particularly in the underground mining environment. For example, in-stream thermal oxidation techniques require the provision to the exhaust stream of large amounts of heat energy to oxidize the particulate matter, which heat is usually unrecoverable, thus reducing efficiency of the system. In-stream catalytic oxidation methods, such as those disclosed by Mayer et al. and Yasuhara do not require additional energy, but have problems of their own. For example, before a catalyst can be effective in oxidizing unburned hydrocarbons, carbon monoxide, and aerosols, it must be placed in the hot exhaust gases and allowed to reach temperatures sufficient to trigger the oxidization process, usually in the range of 400° F.–500° F. The heat released by the oxidation of the exhaust gases further heats the catalyst, so that most catalysts actually reach rather high steady state operating temperatures in the range of 1000° F. to 1400° F. Obviously, adding a catalyst to engines which must meet low surface temperature limits introduces at least two significant difficulties. First is the problem of insulating the catalyst so that the surface temperature of the catalyst housing does not exceed 300° F. Second, the catalyst itself must be sufficiently insulated from the cooling jacket surrounding the catalyst housing so that the catalyst material can reach its normal operating temperature. While the patent issued to Nowak teaches the use of a catalytic converter having a hardened fibrous lining to resiliently support, insulate, and secure a monolithic catalyst element within an exhaust pipe, thus providing improved vibration resistance, Nowak's system does not provide sufficient heat insulation to allow the catalyst to work effectively within a water cooled exhaust pipe. In short, these problems have proven formidable, and catalyst systems have never enjoyed significant success on mine certified diesel engines or engines having water cooled exhaust systems.

Particulate emission has also been reduced by using a filter to trap the particulate matter before it escapes into the surrounding atmosphere. Ceramic materials, stainless steel wire mesh, and other filter materials capable of withstanding the high-temperature exhaust gases have been tried and are being used. The patents issued to Hoch and Yasuhara disclose variations on this theme. Unfortunately, because of the large quantities of particulate matter that are generated by most diesel engines, such filters clog quickly, which increases back pressure in the engine exhaust and affects the performance and efficiency of the engine. Of course, replacing the filter when the back pressure exceeds some predetermined limit would be helpful. However, the metal or ceramic materials used in most effective filters are expensive, so it is simply not practical to throw away such filters when they become clogged.

Several filter regeneration methods have been developed in attempts to make such particulate filter systems reusable. The most common filter regeneration methods rely on either thermal or catalytic oxidation of filter-trapped particulates. Unfortunately, the space, cost, and energy consumption required by such regeneration methods are substantial. Furthermore, in-situ filter regeneration techniques, where the filters rely on the hot exhaust gases themselves to raise the temperature of the filter high enough to oxidize the trapped particles, do not work with the light duty-cycles typically associated with underground engines. Consequently, the high temperature filters used on such engines must be removed and regenerated at some off-site location.

As mentioned above, water scrubbing systems have enjoyed a fair degree of success in reducing the exhaust emissions from engines used in underground mining environments. Most water scrubbing systems, such as those disclosed by Sien and Hill et al., comprise a water-filled baffle chamber that is connected to the exhaust manifold of the engine. The exhaust gases from the engine are bubbled through the water in the chamber, thus cooling the exhaust gases and removing a small percentage (about 10%) of the solid particulate matter. One positive aspect of water scrubbers is that they make excellent flame arresters, which, of course, has made them attractive for use in inflammable atmospheres, such as those typically associated with underground mines. Unfortunately, however, water scrubbers consume relatively large amounts of water and must be thoroughly cleaned at very frequent intervals. Another disadvantage is that water scrubbers do not remove carbon monoxide, oxides of nitrogen, or other gaseous pollutants from the exhaust gases and are only marginally effective in removing the water-soluble sulfur dioxide ($SO_2$) from the exhaust gases. However, even the removal of the sulfur dioxide creates problems because the absorbed sulfur dioxide reacts with the water to form sulfuric acid ($H_2SO_4$), which is eventually emitted from the exhaust system along with the exhaust gases. Furthermore, recent changes in the laws regulating the emissions of mine certified diesel engines have tightened the emission requirements to the point were most water scrubbers just cannot meet the new, more rigorous emission requirements.

The patent issued to Wilkens and assigned to the assignee of this invention uses a "dry" heat exchanger to cool the exhaust gases to avoid some of the problems associated with the water scrubbers. Unfortunately, however, Wilkens' heat exchanger tends to accumulate soot deposits quite rapidly, which significantly reduces the thermal transfer efficiency of the heat exchanger. Consequently, the Wilkens heat exchanger must be disassembled and thoroughly cleaned at frequent intervals; an expensive and time-consuming process. Moreover, the Wilkens' system cannot meet the new exhaust emission requirements because it does not remove any of the solid particulate matter or gaseous pollutants from the engine exhaust.

Some systems have been developed in which the relatively expensive high temperature filters are replaced with cheaper, preferably disposable, low temperature filters. Water scrubbers are used to cool the exhaust gases before they pass through the low temperature filters. However, the moist exhaust gas exiting the water scrubbers tends to foul and clog the low temperature filters quite rapidly, and, as mentioned above, water scrubbers have their own problems and maintenance costs.

Finally, Liu et al. teach an electrostatic particle collector to remove the particulate matter from the exhaust gases. However, the high voltages required by that kind of system introduce yet another explosion hazard when used in underground environments or other environments having inflammable atmospheres.

Consequently, there remains a need for an improved diesel engine emission reduction system that is suitable for use in underground mines or in other environments that have explosive or poorly ventilated atmospheres, or in environments where it is essential that the quantities of solid particulates in the diesel exhaust be kept to a minimum. Such a system must meet the rigorous requirements for spark and flame suppression and for maximum surface and exhaust temperature, while at the same time providing an economical and low maintenance method of removing the solid particulate matter, and preferably some of the carbon monoxide and other pollutants, from the exhaust gas. Ideally, such a system would include a catalytic reactor to oxidize unburned hydrocarbons, carbon monoxide and aerosols to increase the service life of a downstream particulate filter, yet be able to function effectively within a water cooled exhaust manifold and without increasing the surface temperature of the exhaust system to dangerous levels. Until this invention, no such catalytic reactor existed.

SUMMARY OF THE INVENTION

Accordingly, it is a general object of this invention to provide a catalytic reactor for internal combustion engines to reduce the amount of solid particulate matter in the exhaust gas while achieving some reduction in other pollutants, such as carbon monoxide and other gaseous pollutants.

It is another general object of this invention to provide a catalytic reactor suitable for use with engines in underground mines or other environments having poorly ventilated or inflammable atmospheres.

It is a more specific object to provide a catalytic reactor that can effectively oxidize pollutants in the exhaust gas of an internal combustion engine without substantially increasing the surface temperature of the exhaust system.

Another specific object of this invention is to provide a catalytic reactor that can operate effectively within a water jacketed exhaust system.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the heat isolated catalytic reactor according to this invention may comprise a catalyst element for oxidizing selected constituents of the pollutants in the exhaust gas and a heat shield exterior to the catalyst element. The heat shield and catalyst element are mounted within an exhaust pipe so that two annular insulation spaces exist between the catalyst element and the exhaust pipe. The first annular insulation space is located between the interior wall of the exhaust pipe and the exterior wall of the heat shield. The second annular insulation space is located between the interior wall of the heat shield and the catalyst element itself. A spring washer positioned between one end of the catalytic reactor assembly and an axial retaining flange on the exhaust pipe allows the catalytic reactor assembly to expand axially as it heats to operating temperature. A layer of ceramic material may be deposited on the exterior surface of the heat shield to further reduce heat transfer to the exhaust pipe.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
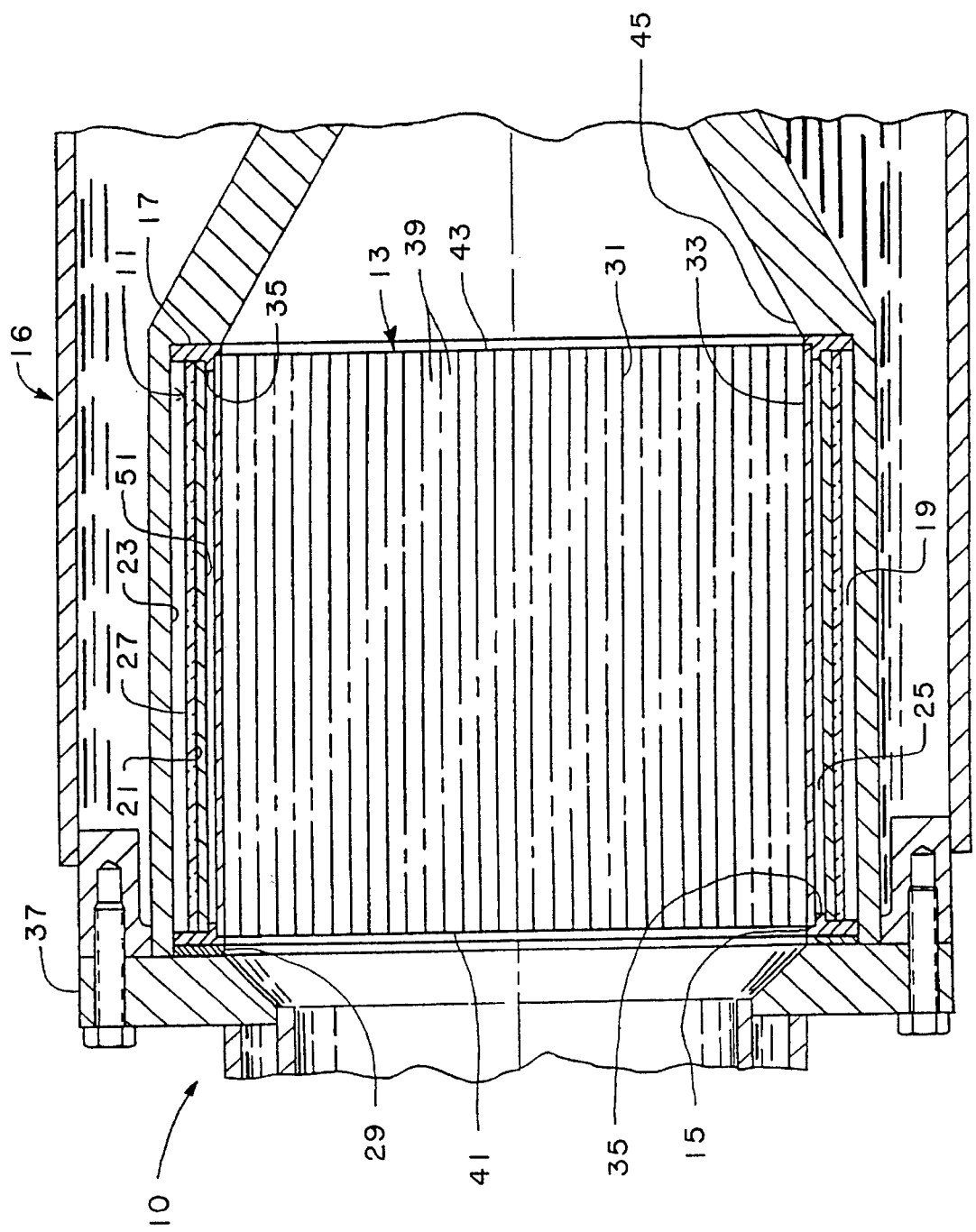
FIG. 1 is a sectional view in elevation of the preferred embodiment of the heat isolated catalytic reactor according to the present invention.

The heat isolated catalytic reactor 10 according to the present invention is shown in FIG. 1 installed inside a water jacketed exhaust manifold 16 of the type typically found "mine certified" diesel engines or diesel engines for marine use. As will be described in much greater detail below, the heat isolated catalytic reactor 10 includes a heat shield 11 and a catalyst element 13 positioned within a water jacketed manifold 16 so that two annular insulation spaces exist between the catalyst element and the exhaust manifold. More specifically, a first annular insulation space 19 exists between the heat shield 11 and the water cooled manifold 16 and a second annular insulation space 25 exists between the catalyst element 13 and the heat shield 11. The outer wall 21 of heat shield 11 also includes a ceramic layer 27 to further reduce heat transfer, as will be described in more detail below.

One of the main advantages of the heat isolated catalytic reactor according to this invention results from the exceptional insulation properties afforded by the dual annular insulation spaces 19 and 25. Those insulation spaces allow the catalytic reactor 10 to reach relatively high steady state temperatures (in the range of 1000° F. to 1400° F.), even though the inside wall of the exhaust manifold may be as cool as 250° F. to 300° F. Consequently, the catalytic reactor according to the present invention is an ideal candidate for use with a "mine certified" diesel exhaust emission control system or other engines that have maximum surface temperature limits.

Another advantage of the present invention is that the catalytic reactor 10 includes a temperature compensated mounting system, thus allowing the catalytic reactor 10 to expand freely within the manifold 16 without being damaged. Finally, the catalyst element according to the present invention significantly increases the replacement interval for any particulate filters positioned downstream from the catalyst, since it substantially reduces the amount of particulate matter in the exhaust gases.

Figure 2:
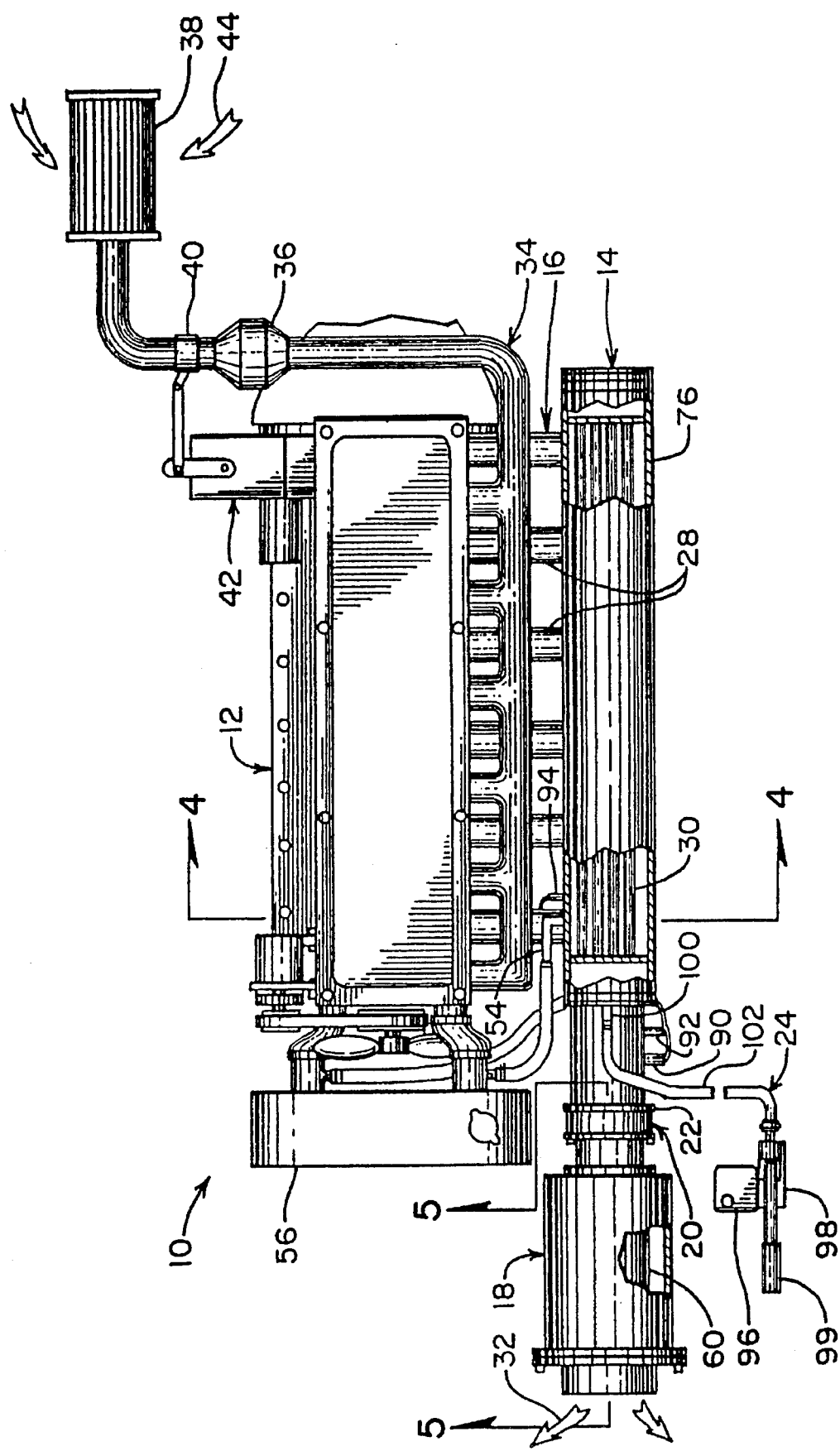
FIG. 2 is a plan view of a mine certified diesel engine having an exhaust treatment system that includes the heat isolated catalytic reactor of the present invention and a water cooled heat exchanger and filter assembly.
Figure 4:
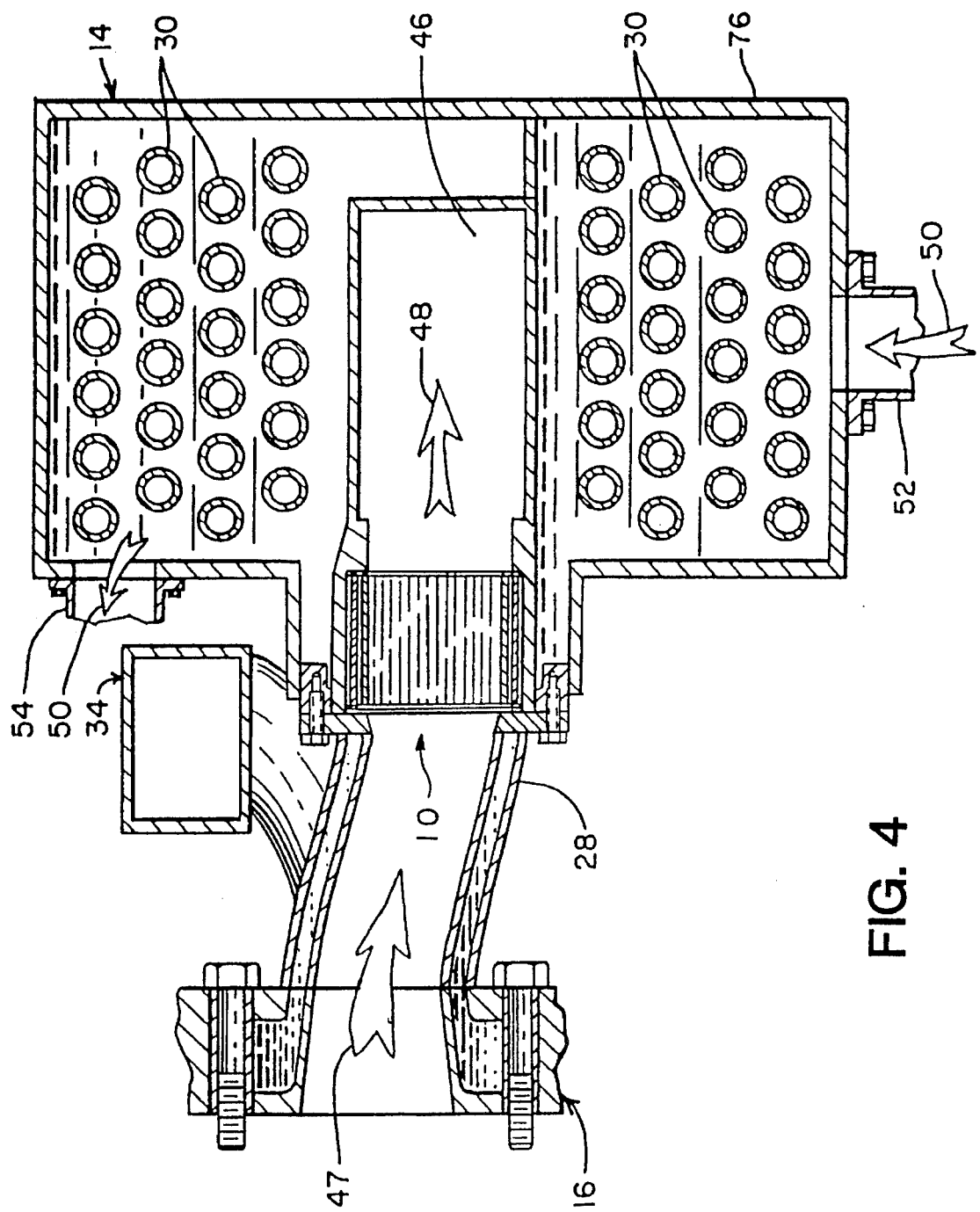
FIG. 4 is a sectional view in elevation of the water cooled heat exchanger and exhaust manifold assembly taken along the line 4—4 in FIG. 2, showing the arrangement of a heat isolated catalytic reactor according to the present invention, as well as the exhaust collection chamber, the cooling tubes, and the flow of cooling water through the heat exchanger.

Referring now to FIGS. 1 and 2, the catalytic reactor 10 is shown and described herein as it could be used on an MWM D916-6 diesel engine 12 having the improved exhaust treatment system disclosed in U.S. Pat. No. 5,272,874. Briefly, the improved exhaust treatment system shown in FIG. 2 includes a self-cleaning exhaust gas heat exchanger 14 to cool the exhaust gases and a particulate filter assembly 18 for removing substantially all of the solid particulate matter entrained in the exhaust. The improved exhaust treatment system also includes an intermittent water injection system 24 for removing accumulated soot deposits from the heat exchanger. In the embodiment shown in FIG. 2, the catalyst assemblies 10 are located where exhaust runners 28 of manifold 16 connect to heat exchanger 14, as best seen in FIG. 4.

Before proceeding with the description, it should be understood that while the improved exhaust treatment system shown and described herein includes a number of components for removing particulates and other pollutants from the exhaust gas of the diesel engine, the use of the heat isolated catalytic reactor 10 is not contingent on the presence or absence of such components. Indeed, the catalyst assemblies according to the present invention can be used in any application where reduction of exhaust emissions is desired. Finally, while the catalyst assemblies 10 used in the exhaust treatment system are very effective in removing most of the pollutants from the engine exhaust, it is preferred that the engine also burn low-sulfur or no-sulfur fuel to further reduce sulfate emissions and to extend catalyst life.

During engine operation, intake air 44 is drawn into the engine 12 through an intake air filter 38 and a spark arrester assembly 36. The intake air 44 is compressed, mixed with fuel, and the fuel-air mixture burned in the engine combustion chambers (not shown) in a conventional manner. Immediately after leaving the combustion chamber, the raw exhaust gases 47 (FIG. 4) pass through the catalyst assemblies 10 in exhaust manifold 16, which oxidize some of the unburned hydrocarbons, thereby eliminating some of the solid particulate matter in the exhaust gases that would otherwise have to be trapped by filter assembly 18. The catalyst assemblies 10 also oxidize the carbon monoxide to carbon dioxide and reduce the amount of unburned hydrocarbons and aerosols in the exhaust gas. The catalyzed exhaust gases 48 next pass through a plurality of water cooled tubes 30 in heat exchanger 14, which cools down the hot exhaust gases from temperatures in the 1200° F. range to temperatures below 300° F. See FIGS. 3 and 4. The cooled exhaust gases 58 then exit the heat exchanger 14 and enter the filter assembly 18 (FIG. 5), which removes substantially all of the remaining solid particulate soot matter from the exhaust gases. The cooled, filtered exhaust gases 32 are then discharged into the atmosphere.

Because the engine 12 is certified for use in underground mining environments, it contains numerous additional safety components that are not part of the heat isolated catalyst assemblies 10 according to the present invention. Diesel engines used in underground mining environments are generally subject to a wide variety of safety requirements established by the Mine Safety and Health Administration (MSHA), such as spark and fire suppression requirements as well as maximum allowable surface temperature limits and exhaust gas temperature limits, just to name a few. Consequently, the "mine certified" engine system shown and described herein includes such additional components to meet those safety requirements. However, it should be understood that such additional components would not necessarily be required or desired in other applications. Furthermore, since such additional components are well known in the art and since the provision or omission of such components, or the addition of any other components or modifications required or desirable for a specific application, would be obvious to persons having ordinary skill in the art, such additional components will only be generally described herein.

Referring again to FIG. 2, diesel engine 12 includes a conventional mine certified intake manifold 34 having a flame arrester assembly 36, and emergency intake air shut off valve 40, and air intake filter assembly 38. The flame arrester assembly 36 is required to meet current MSHA safety regulations and prevents flames from propagating back through the intake system in the event of engine backfire. The emergency intake air shut off valve 40 is positioned between the spark arrester assembly 36 and the air intake filter 38 and is controlled by emergency shut off system 42. If a dangerous operating condition is detected by any one of a number of sensors, the system 42 will close valve 40, thus stopping the engine 12. For example, in the preferred embodiment, the emergency shut off system 42 may shut down the engine if a high coolant temperature or low coolant level is detected, or if the temperature of the exhaust gases exceeds the maximum allowable safe temperature. The emergency shut off system 42 also includes a fuel shut off system (not shown) to further ensure rapid engine shut-down. Of course, the specific emergency shut off systems that would need to be provided on a particular engine would depend on the current MSHA regulations and on the particular application. However, because such emergency shut off systems are well-known in the industry, the appropriate systems can be easily provided by persons having ordinary skill in the art once they become familiar with the regulations, the particular application, and the details of this invention. Therefore, such emergency shut off systems will not be described in further detail. Also, since the mine certified engine 12 shown in FIG. 2 is limited to maximum allowable surface temperatures of 300° F., the entire exhaust system, including the exhaust manifold 16, is water jacketed to prevent the surface temperature of the manifold from exceeding that maximum allowable limit. Similarly, the water cooled heat exchanger 14 is also designed to meet that surface temperature limit.

The details of the heat isolated catalytic reactor 10 are best seen by referring to FIGS. 1 and 4 simultaneously. Essentially, the catalytic reactor 10 comprises a heat shield 11 and a catalyst element 13 positioned inside the water jacketed manifold 16. The reactor 10 is axially retained between flanges 37 and 45 of manifold 14 and is radially retained by first and second mounting rings 15 and 17, as best seen in FIG. 1. A raised lip or boss 35 on each mounting ring positions the heat shield 11 and catalyst element 13 within the manifold 16 so that a first annular insulation space 19 exists between the inner wall 23 of manifold 16 and the heat shield 11, and a second annular insulation space exists between the casing 33 of catalyst element 13 and the heat shield 11. While the dimensions of the annular insulation spaces 19 and 25 are not particularly critical, the invention works best when the first annular insulation space 19 is in the range of about 0.060" to 0.250" inches, and the second annular insulation space is in the range of about 0.015" to 0.125" inches.

A Belleville or spring washer 29 positioned between the first mounting ring 15 and the exhaust manifold flange 37 allows the catalytic reactor 10 to expand and contract axially in the space between the two flanges 37 and 45 as it heats and cools. Since both mounting rings 15 and 17 and the Belleville spring 29 are in intimate thermal contact with the relatively cool walls of the exhaust manifold 16, they need not be constructed from refractory materials, and may be constructed from nearly any material, such as stainless steel, capable of withstanding moderate temperatures.

Catalyst element 13 comprises a corrugated or honeycomb substrate 31 that is encased by a stainless steel jacket or casing 33. The corrugated substrate 31 includes a plurality of passages 39 through which exhaust gases pass as they travel from the inlet face 41 to the outlet face 43. The desired catalytic material is deposited by a suitable process on the walls of the passages 39 so that the exhaust gas is in contact with the catalyst as it passes through the catalyst element 13. In the preferred embodiment, platinum is used as the catalyst, although any other catalyst, or combination of catalysts, could be used just as easily, as would be obvious to persons having ordinary skill in the art.

The heat shield 11 is made from a heat resistant material capable of withstanding the temperatures expected to be encountered. In the preferred embodiment, the heat shield 11 is fabricated from stainless steel and includes a ceramic layer 27 deposited by a suitable process, such as plasma spraying, on the outer wall 21. In the preferred embodiment, the ceramic layer 27 is yttrium-zinc oxide and is deposited by a proprietary plasma spray process used by General Plasma Corporation of Woburn, Mass. While the thickness of the ceramic layer 27 is not critical to the operation of the invention, a thickness in the range of 0.018"–0.022" has proven satisfactory.

Ceramic layer 27 need not need be deposited on the outer wall 21 of heat shield 11, but could be deposited on other surfaces of the assembly with substantially equal effectiveness. For example, the ceramic layer 27 could be deposited on the inner wall 51 of heat shield 11, or it could be deposited directly on the stainless steel casing 33 of the catalyst element 13. Accordingly, the present invention should not be regarded as limited to having the ceramic layer 27 deposited on the outer wall 21 of heat shield 11.

Figure 3:
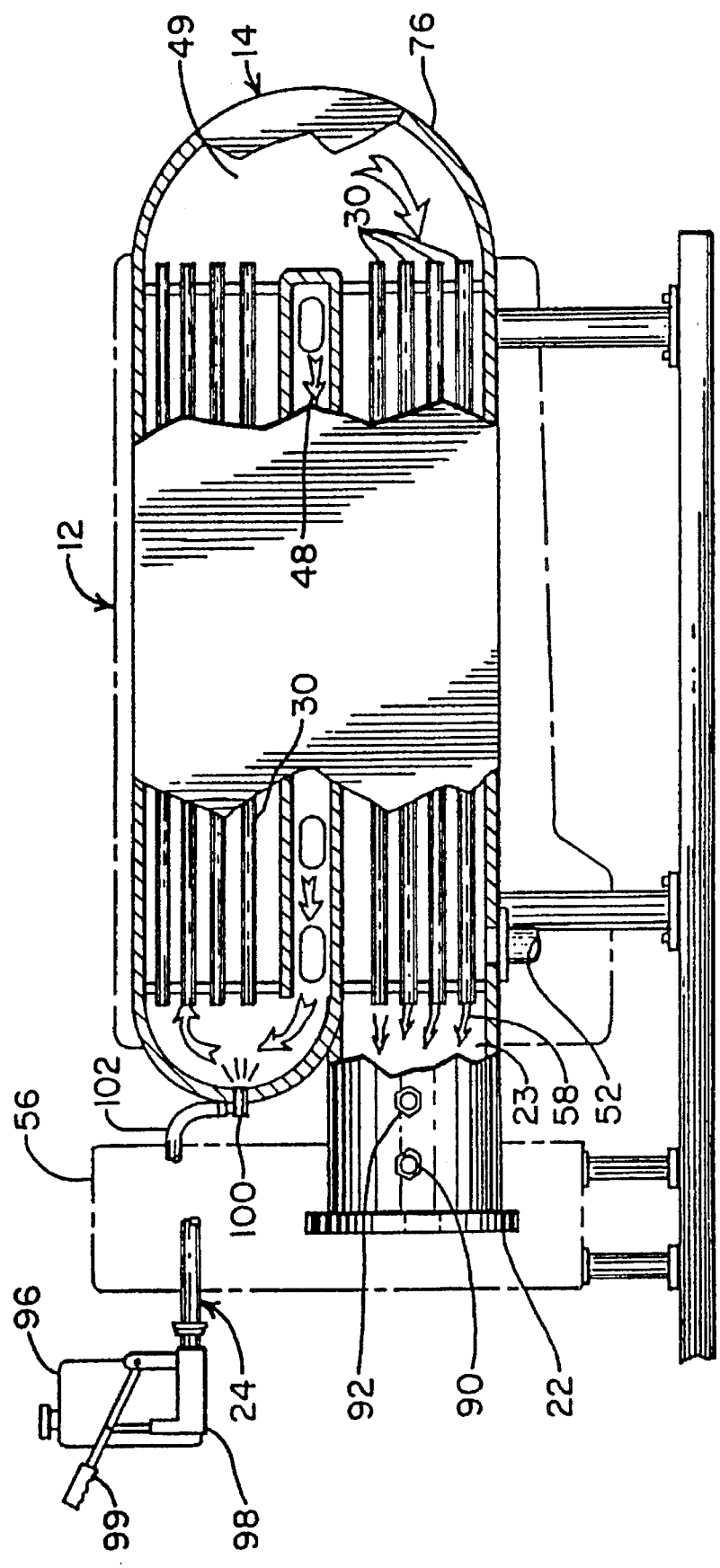
FIG. 3 is a side view in elevation of the water cooled heat exchanger with the filter assembly removed and with portions of the external housing of the heat exchanger broken away to show the details of the exhaust collection chamber, the cooling tubes, the flame-proof water injection nozzle, and the flow of the exhaust gases through the heat exchanger.

Heat exchanger 14 comprises a plurality of horizontal cooling tubes 30 arranged in parallel, spaced-apart relation inside an external housing 76 and above and below a central exhaust collector chamber 46, as best seen in FIGS. 2 and 3. Cooling water 50 from radiator 56 enters the external housing 76 through bottom inlet 52, and circulates around the lower cooling tubes 30, up around the upper cooling tubes 30, and out through outlet 54. The hot exhaust cooling water 50 is then pumped through radiator 56 where it is cooled and recirculated back through the heat exchanger 14.

Figure 5:
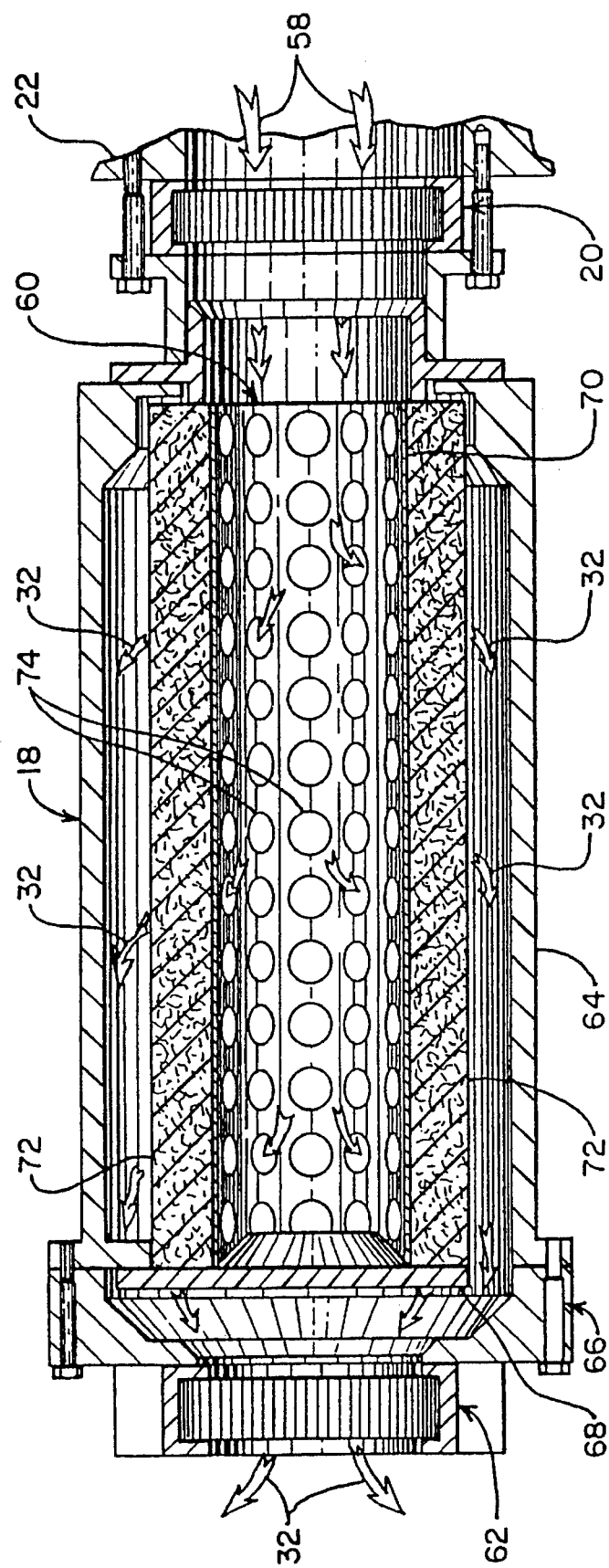
FIG. 5 is a sectional view in elevation of the filter and optional spark arrester assembly taken along the line 5—5 of FIG. 2, showing the position of the disposable, low temperature filter element and the flow of exhaust gases through the filter.

Filter assembly 18 comprises a cylindrical housing 64 adapted for attachment to a flame arrester assembly 20, as shown in FIG. 5. Alternatively, cylindrical housing 64 may be attached directly to one end of flange 22 on heat exchanger 14. An end cap assembly 66 bolted to the opposite end of cylindrical housing 64 includes an end plate 68 for sealing off the central cavity 70 of filter 60 so that the cooled exhaust gases 58 are directed through the filter material 72 via the plurality of apertures 74 in cavity 70, as will be described below. When the filter element 60 becomes clogged, end cap assembly 66 can be easily removed, the clogged filter element 60 removed and discarded, and a new filter element inserted into the housing 18. In the preferred embodiment, the filter element 60 is a disposable diesel exhaust filter of the type manufactured by Fleetguard, Inc. of Nashville Tenn.

Figure 6:
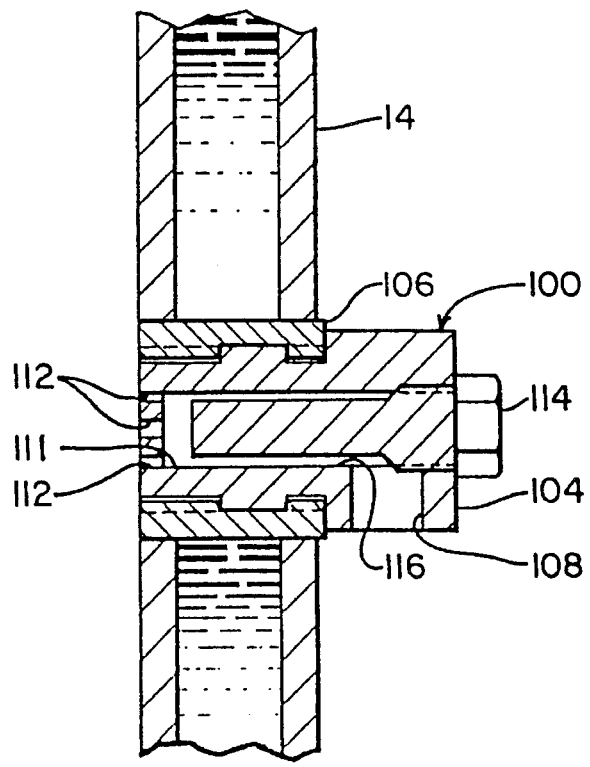
FIG. 6 is a sectional view in elevation of the flame-proof water injection nozzle according to the present invention.

The water injection system 24 is best seen in FIGS. 2 and 6 and comprises a reservoir and check valve assembly 96, a hand operated piston pump 98, and a flame proof injector nozzle 100. In the preferred embodiment, the reservoir and check valve assembly 96 and hand operated piston pump 98 are remotely located from the engine 12 to allow easy access by the operator. Reservoir 96 contains a supply of water and is connected to a small displacement piston pump 98 via a check valve (not shown), which prevents water from being pumped back into the reservoir. Piston pump 98 is actuated by handle 99 to pump about 1 oz. of water through hose 102 to the flame proof injector 100. Note that other devices could be used to inject the water. For example, the hand operated piston pump 98 could be automatically actuated by a pneumatic or hydraulic actuating system, which actuating system could be either manually or automatically triggered. Still other alternatives are possible and would be obvious to persons having ordinary skill in the art. Therefore, the present invention should not be regarded as limited to the hand operated water injection method shown and described herein.

The details of the flame proof injector 100 are best seen in FIG. 6. The injector 100 comprises a main body 104 that screws into a threaded insert 106 in heat exchanger 14. Main body 104 includes a water inlet 108 and a central cavity 110. A plurality of holes 112 drilled through main body 104 allow water in the central cavity 111 to be sprayed into the interior of the heat exchanger 14. A central plug 114 passes through the central cavity 111 and creates a small annulus 116 between the cavity 111 and the plug 114. This small annulus 116 is sufficiently long to suppress any flame that may propagate through the holes 112 before it reaches the inlet 108. In the preferred embodiment, the annulus gap is less than 0.018" and about 1" long. This annulus length and gap meets or exceeds the flame suppression requirements set by MSHA.

During engine operation, raw exhaust gases 47 from the combustion chambers enter each of the water jacketed runners 28 of manifold 16 and pass through catalyst assemblies 10, as best seen in FIG. 4. In accordance with well-known principles, the catalytic reactor 10, operating at very high temperatures, oxidizes some of the unburned hydrocarbons in the raw exhaust gases 47 and also oxidizes carbon monoxide, converting it into carbon dioxide. The catalyst 10 also reduces odors and aerosols in the exhaust gases as well.

The catalyzed exhaust gases 48 next enter the central collector chamber 46 of heat exchanger 14, as best seen in FIGS. 3 and 4. The catalyzed exhaust gases 48 travel down the central collector chamber 46 and enter the upper series of cooling tubes 30. The hot catalyzed exhaust gases are cooled as they travel through the upper series of water cooled tubes 30, into intermediate plenum chamber 49, and through the lower series of cooling tubes 30. The cooling water 50 circulating around the outside of tubes 30 absorbs the heat from the hot, catalyzed exhaust gases 48, so that the exhaust gases are cooled below 300° F. by the time the cooled exhaust gases 58 enter outlet plenum 23 of heat exchanger 14. Outlet plenum 23 also contains an exhaust back pressure sensor 90 and an exhaust gas temperature sensor 92. In the preferred embodiment, the exhaust back pressure sensor 90 is connected to a suitable gauge (not shown), so that the operator can monitor the exhaust back pressure. If the back pressure exceeds the maximum back pressure allowable for the particular engine, the operator can then manually shut down the engine and replace the filter element 60. The heat exchanger 14 also contains a cooling water temperature sensor 94 (FIG. 2) and the safety shut down system 42 will shut down the engine if the cooling water temperature exceeds 210° F. or if the exhaust gas temperature exceeds 300° F.

Referring now to FIG. 5, the cooled exhaust gases 58 next pass through optional flame arrester assembly 20, which extinguishes any flames which may be present in the exhaust, and into filter assembly 18. The cooled exhaust gases 58 are directed through the disposable low temperature filter element 60, which traps the solid particulate soot matter and any sparks that may also be entrained in the cooled exhaust gases 58. The filtered exhaust gas 32 exits filter assembly 18 via another flame arrester assembly 62, which serves as a safeguard against flames being discharged with the exhaust gases.

It is desirable to use the water injection system 24 to clean out the cooling tubes in the heat exchanger 14 just before the filter element 60 is changed. Heat exchanger cleaning is best accomplished by speeding up the engine to maximum rated rpm to increase the exhaust gas flow rate through the heat exchanger 14. The operator can then operate piston pump handle 99 to forcibly inject about 1 oz. of water into the hot catalyzed exhaust gases 48 just upstream of the upper cooling tubes 30. See FIG. 3. The injected water instantly flashes to steam, which creates a pressure pulse that travels down the cooling tubes, forcibly dislodging and blowing out the soot that accumulated on the inside surfaces of the cooling tubes. The dislodged soot is then carried downstream to the filter assembly 18 which traps the dislodged soot. Because of the large amount of soot that is dislodged in this cleaning process, it is usually necessary to change the filter element 60 immediately. A new filter can then be installed and the engine operated normally. Just before the end of the next filter change interval, the water injection process is again performed to clean out the heat exchanger and the filter element replaced again. If the heat exchanger 14 is heavily sooted (due to engine malfunction), the injection process can be repeated until all the soot is blown out of the heat exchanger.

Figure 8:
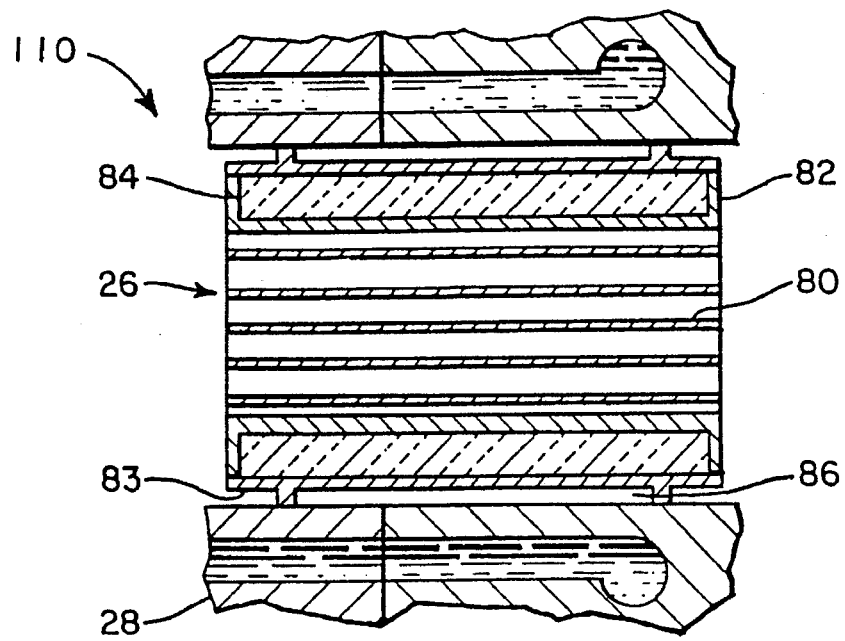
FIG. 8 is an enlarged sectional view of the second embodiment of the heat isolated catalytic reactor shown in FIG. 7.
Figure 7:
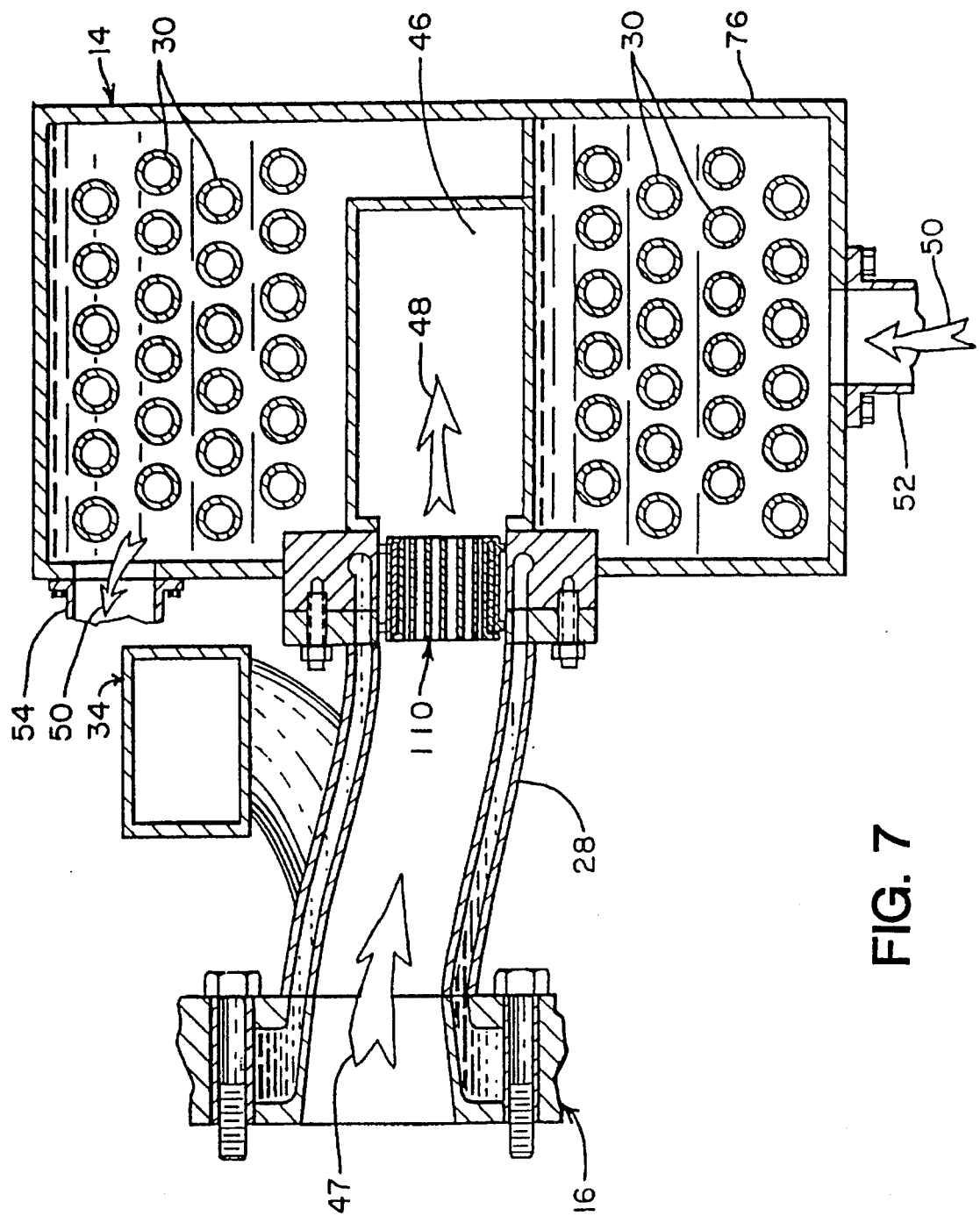
FIG. 7 is a sectional view in elevation of a second embodiment of the heat isolated catalytic reactor according to the present invention installed in the water jacketed manifold of the engine.

A second embodiment 110 of the heat isolated catalytic reactor according to the present invention is shown in FIGS. 7 and 8. Catalytic reactor 110 comprises a honeycomb ceramic catalyst support 80 coated with a suitable catalyst, such as platinum, and encased by a stainless steel cylindrical inner heat shield or jacket 82. An outer heat shield or jacket 83 surrounds the inner heat shield 82 and secures the catalytic reactor 110 within the exhaust runner 28. A heat insulating ceramic fiber material 84, such as Nextel™ ceramic fiber available from 3M, disposed in the annulus between the inner heat shield 82 and the outer heat shield 83, prevents excessive heat from the catalyst 80, which operates at temperatures between 1000° F. and 1400° F., from being transferred to the outer heat shield 83 and manifold runner 28. The small annulus 86 between the outer heat shield 83 and the inside surface of the exhaust manifold runner 28 further helps to prevent heat from being transferred from the catalyst material 80 into the cooling water surrounding the manifold runner 28. The combination of the annulus space 86 and the heat insulator 84 sufficiently insulates the catalyst material 80 from the cool exhaust manifold 16, so that the catalyst material can heat to its operating temperature and burn unburned hydrocarbons, reduce aerosols, and oxidize carbon monoxide to carbon dioxide.

This completes the detailed description of the heat insulated catalytic reactor according to the present invention. While the catalytic reactor 10 was described above as it could be used with a diesel engine for underground mining use, many other applications are possible. For example, the heat isolated catalytic reactor according to the present invention could be used in marine engines, automobile or truck engines where control of catalyst heat is a problem, or engines used in environments requiring that maximum surface temperature limits be imposed for safety reasons. In short, the catalytic reactor may be used in any application where it is desirable to limit the amount of heat that is transferred from the hot catalyst element to the surrounding structure, or where the catalyst must function within a relatively cool mounting structure.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. A catalytic reactor for use in an exhaust pipe carrying exhaust gases, the exhaust pipe having an interior wall, comprising:

catalyst means for oxidizing selected constituents of the exhaust gases;

a heat shield exterior to said catalyst means and having an interior wall and an exterior wall and a first end and a second end; and mounting means for positioning said heat shield within the exhaust pipe to create a first annular insulation space between the interior wall of the exhaust pipe and the exterior wall of said heat shield and for positioning said catalyst means within said heat shield to create a second annular insulation space between said catalyst means and the interior wall of said heat shield.

2. The catalytic reactor of claim 1, further comprising heat insulating means exterior to said heat shield and interior to the first annular insulation space for reducing heat transfer between said catalyst means and the first annular insulation space.

3. A catalytic reactor for use in an exhaust pipe carrying exhaust gases, the exhaust pipe having an interior wall, comprising:

catalyst means for oxidizing selected constituents of the exhaust gases;

a heat shield exterior to said catalyst means and having an interior wall and an exterior wall and a first end and a second end;

mounting means for positioning said heat Shield within the exhaust pipe to create a first annular insulation space between the interior wall of the exhaust pipe and the exterior wall of said heat shield and for positioning said catalyst means within said heat shield to create a second annular insulation space between said catalyst means and the interior wall of said heat shield, wherein said mounting means comprises first and second mounting rings positioned at the first and second ends of said heat shield, respectively, said first and second mounting rings being adapted to receive and position said catalyst means and said heat shield to create the first and second annular insulation spaces; and heat insulating means exterior to said heat shield and interior to the first annular insulation space for reducing heat transfer between said catalyst means and the first annular insulation space.

4. The catalytic reactor of claim 3, wherein said heat insulating means comprises a ceramic coating on the exterior wall of said heat shield.

5. The catalytic reactor of claim 4, wherein said ceramic coating is yttrium zinc oxide.

6. The catalytic reactor of claim 5, wherein said catalyst means comprises;

a casing;

a corrugated substrate attached interior to said casing; and a catalyst deposited on said corrugated substrate.

7. The catalytic reactor of claim 6, wherein said catalyst is platinum.

8. The catalytic reactor of claim 1 wherein the exhaust pipe includes a first flange adjacent the first end of said heat shield and a second flange adjacent the second end of said heat shield, said first and second flanges axially retaining said heat shield within the exhaust pipe, said catalytic reactor including spring means disposed between the first flange of the exhaust pipe and the first end of the heat shield for allowing the heat shield to move axially toward and away from the first flange.

9. The catalytic reactor of claim 1, further comprising heat insulating means interior to said heat shield and exterior to the second annular insulation space for reducing heat transfer between said catalyst means and the second annular insulation space.

10. The catalytic reactor of claim 9, wherein said heat insulating means comprises a ceramic coating on the interior wall of said heat shield.

11. The catalytic reactor of claim 1, further comprising heat insulating means interior to the second annular insulation space and exterior to said ,catalyst means for reducing heat transfer between said catalyst means and the second annular insulation space.

12. The catalytic reactor of claim 11, wherein said heat insulating means comprises a ceramic coating on said catalyst means.

13. A heat insulated catalytic reactor for use in an exhaust manifold of an internal combustion engine, comprising:

an elongated cylindrically-shaped outer heat shield having a first end and second end separated by a cylindrically-shaped center section, said outer heat shield having a first annular mounting boss located at about the first end and a second annular mounting boss located at about the second end, said first and second mounting bosses being adapted to position and secure said outer heat shield in the exhaust manifold, said first and second mounting bosses also defining a first annular insulation space between said outer heat shield and the exhaust manifold;

an elongated cylindrically-shaped inner heat shield having a first end and a second end separated by a cylindrically-shaped center section, the interior of said inner heat shield defining a catalyst cavity, and wherein said first and second ends have larger diameters than the cylindrically-shaped center section and are adapted to securely position and hold said inner heat shield within said outer heat shield, said first and second ends creating a second annular insulation space between said outer heat shield and said inner heat shield when said inner heat shield is positioned within said outer heat shield;

a catalyst disposed within the catalyst cavity of said heat shield; and heat insulating means surrounding the cylindrically-shaped center section of said inner heat shield in the second annular insulation space for reducing heat transfer between said inner heat shield and said outer heat shield.

14. The heat insulated catalytic reactor of claim 13, wherein said heat insulating means comprises ceramic fiber.

15. The heat insulated catalytic reactor of claim 14, wherein said catalyst is platinum.

* * * * *